United States Patent [19]

Ishiyama

[11] Patent Number: 5,433,421
[45] Date of Patent: Jul. 18, 1995

[54] VIBRATION ISOLATING APPARATUS

[75] Inventor: Tatsuro Ishiyama, Yokohama, Japan

[73] Assignee: Bridgestone Corporation, Tokyo, Japan

[21] Appl. No.: 909,173

[22] Filed: Jul. 6, 1992

[30] Foreign Application Priority Data

Jul. 8, 1991 [JP] Japan .................. 3-166922

[51] Int. Cl.$^6$ .................. F16F 9/16; F16M 5/00
[52] U.S. Cl. .................. 267/140.13; 267/219; 248/559; 248/562; 248/636
[58] Field of Search .................. 248/562, 636, 559; 267/140.11, 140.13, 219; 180/312, 902

[56] References Cited

U.S. PATENT DOCUMENTS

| | | | |
|---|---|---|---|
| 4,483,521 | 11/1984 | Kakimoto | 267/140.13 X |
| 4,757,982 | 7/1988 | Andra et al. | 267/219 |
| 4,770,396 | 9/1988 | Jouade | 267/140.1 |
| 4,826,126 | 5/1989 | Katayama et al. | 267/140.13 X |
| 4,836,512 | 6/1989 | Lun | 267/140.13 |
| 4,997,168 | 3/1991 | Kato | 267/140.1 |
| 5,170,998 | 12/1992 | Muramatsu | 267/140.13 |

FOREIGN PATENT DOCUMENTS

| | | | |
|---|---|---|---|
| 3936720 | 5/1990 | Germany . | |
| 60-91037 | 5/1985 | Japan | 267/140.13 |
| 60-104824 | 6/1985 | Japan . | |
| 60-113835 | 6/1985 | Japan . | |
| 60-132144 | 7/1985 | Japan . | |
| 60-155029 | 8/1985 | Japan . | |
| 60-249749 | 12/1985 | Japan . | |

Primary Examiner—Richard K. Seidel
Assistant Examiner—Raymond D. Woods
Attorney, Agent, or Firm—Oliff & Berridge

[57] ABSTRACT

A vibration isolating apparatus in which a vibrating body, which is disposed within a pressure-receiving liquid chamber and is connected to a mounting member such that a gap is formed between an inner wall surface of the pressure-receiving liquid chamber and the vibrating body, is disposed. An elongated limiting passage is formed in the vibrating body so as to penetrate therethrough. The limiting passage communicates the pressure-receiving liquid chamber and an auxiliary liquid chamber provided within the mounting member. When there is low-frequency vibration, there is liquid-column resonance of a liquid within the limiting passage. However, because the limiting passage is elongated, the liquid-column resonance of the liquid therein is large, and a high loss factor is obtained. Therefore, the low-frequency vibration is reliably absorbed. When there is high-frequency vibration, there is liquid-column resonance of the liquid in a vicinity of the gap. A dynamic spring constant decreases, and the high-frequency vibration is reliably absorbed.

24 Claims, 9 Drawing Sheets

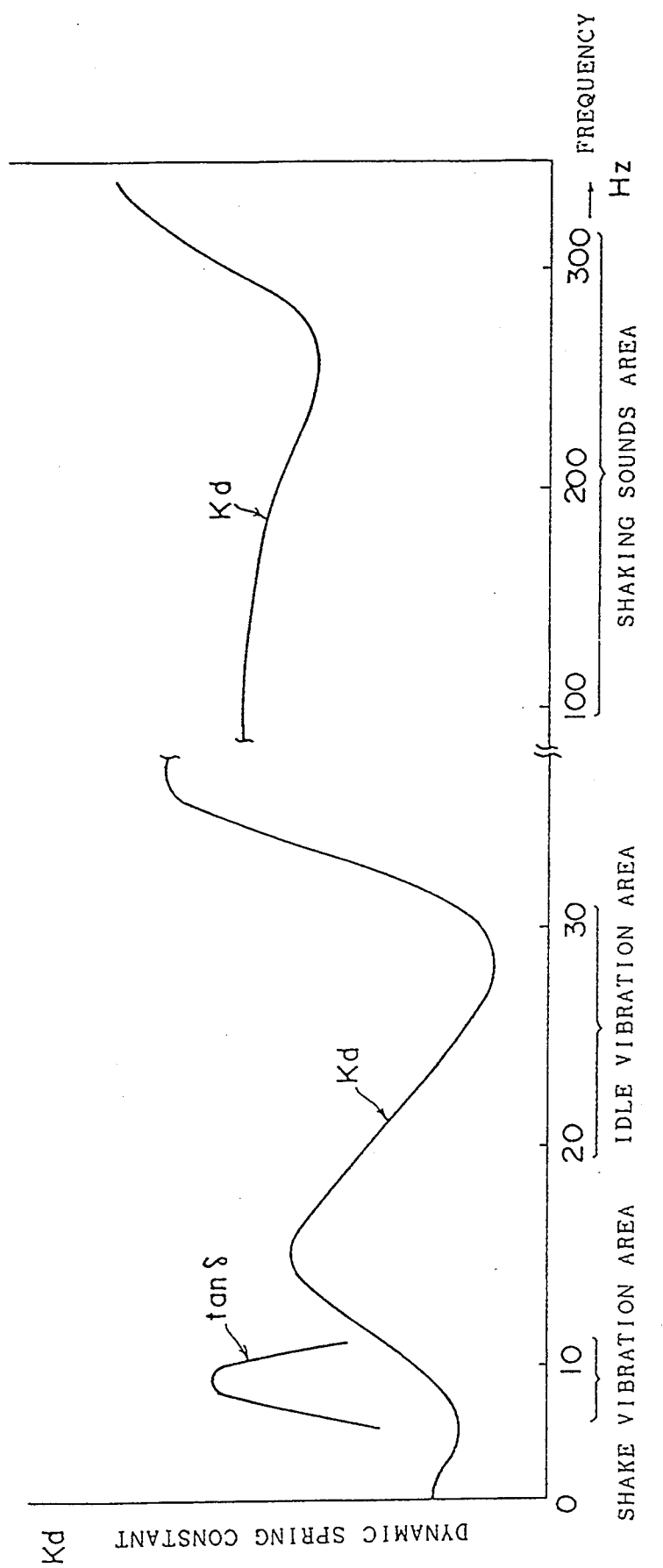

VIBRATION ISOLATING APPARATUS

BACKGROUND OF THE INVENTION

1. Field of the Invention

The present invention relates to a liquid-containing type vibration isolating apparatus which is used in an engine mount or the like in a vehicle such as an automobile, and which absorbs and damps vibrations from a vibration generating portion.

2. Description of the Related Art

A liquid-containing type vibration isolating apparatus has been proposed in Japanese Patent Application Laid-Open No. 60-104824 as a vibration isolating apparatus to be used in an engine mount or the like for automobiles.

In this vibration isolating apparatus, an interruption plate member separates a pressure-receiving liquid chamber and an auxiliary liquid chamber. The chambers communicate with each other via an orifice formed in the interruption plate member. Further, a plate member, which is connected to a mounting member of an engine, is disposed within the pressure-receiving liquid chamber.

In this vibration isolating apparatus, low-frequency vibrations are absorbed by liquid resonating in the orifice. High-frequency vibrations which are greater than or equal to several hundred Hz are absorbed by resonance of liquid in a vicinity of the interruption plate member.

In order to effectively absorb low-frequency vibrations, it is necessary to lengthen the path between the liquid chambers and obtain a large loss factor (tan$\delta$). However, in this vibration isolating apparatus, because the liquid chambers are connected via the orifice, a large loss factor cannot be obtained.

Further, among low-frequency vibrations, there is shake vibration (e.g., vibration whose frequency is approximately 10 Hz) and idle vibration (e.g., vibration whose frequency is approximately 20 to 30 Hz), which differ from each other in frequency. Accordingly, when the orifice is tuned to the frequency of shake vibrations, the efficiency of damping idle vibrations deteriorates. Both shake vibrations and idle vibrations cannot be effectively absorbed.

SUMMARY OF THE INVENTION

With the aforementioned in view, an object of the present invention is to provide a vibration isolating apparatus which can reliably absorb not only high-frequency vibrations but low-frequency vibrations as well.

The first aspect of the present invention is a vibration isolating apparatus which is equipped with a first mounting member connected to one of a vibration generating portion and a vibration receiving portion, a second mounting member connected to another of the vibration generating portion and the vibration receiving portion, an elastic body provided between the first mounting member and the second mounting member and deformable when vibration is generated, and a pressure-receiving liquid chamber formed as a portion of a separating wall of the elastic body and able to expand and contract. The vibration isolating apparatus is characterized by a vibrating body mounted to one, of the first mounting portion and the second mounting portion, which is connected to the vibration generating portion, and disposed in the pressure-receiving liquid chamber to form a gap between the vibrating body and an inner wall surface of the pressure-receiving chamber, a first auxiliary liquid chamber separated from the pressure-receiving liquid chamber, and a first limiting passage penetrating the vibrating body and communicating the pressure-receiving chamber and the first auxiliary chamber.

In the vibration isolating apparatus of the present invention, for example, when the first mounting member is connected to an engine of a vehicle and the second mounting member is connected to a vehicle body of the vehicle, the vibrations of the engine are supported to the vehicle body via the first mounting member, the elastic body and the second mounting member. At this time, the vibrations of the engine are absorbed by resistance based on internal friction of the elastic body. When there are low-frequency vibrations, the liquid inside the pressure-receiving liquid chamber comes and goes into the first auxiliary liquid chamber via the first limiting passage. The vibrations are absorbed by resistance or liquid-column resonance at the time of the liquid passing through the first limiting passage. Especially because the first limiting passage is elongated, a large loss factor (tan$\delta$) can be achieved. Further, when the engine vibrations are high-frequency vibrations, the first limiting passage becomes blocked. However, the high-frequency vibrations are absorbed by the liquid vibrating between the vibrating body and the inner wall surface of the pressure-receiving liquid chamber.

Moreover, in the vibration isolating apparatus of the present invention, a second auxiliary liquid chamber is connected to the pressure-receiving liquid chamber via a second limiting passage. Vibrations, which are in a frequency area other than that of the vibrations absorbed in the first limiting passage and other than that of the vibrations which are absorbed by the liquid between the vibrating body and the pressure-receiving liquid chamber vibrating, can thereby be absorbed by passing resistance of the liquid or liquid-column resonance within the second limiting passage. Namely, three kinds of vibrations of different frequencies can be absorbed.

In the vibration isolating apparatus of the present invention, the elastic body is provided so as to be interposed between the first auxiliary liquid chamber and the pressure-receiving chamber, i.e., one portion of the elastic body is used to form the first auxiliary liquid chamber. The amount of members used to form the other portions of the first auxiliary liquid chamber can thereby be reduced.

Because the vibration isolating apparatus of the present invention is structured as described above, a superior effect can be achieved in that not only high-frequency vibrations, but low-frequency vibrations as well, can be reliably absorbed.

BRIEF DESCRIPTION OF THE DRAWINGS

FIG. 9 is a graph illustrating a vibration isolating characteristic of the vibration isolating apparatus relating to the second embodiment of the present invention.

DESCRIPTION OF THE PREFERRED EMBODIMENTS

First Embodiment

Figure 1:
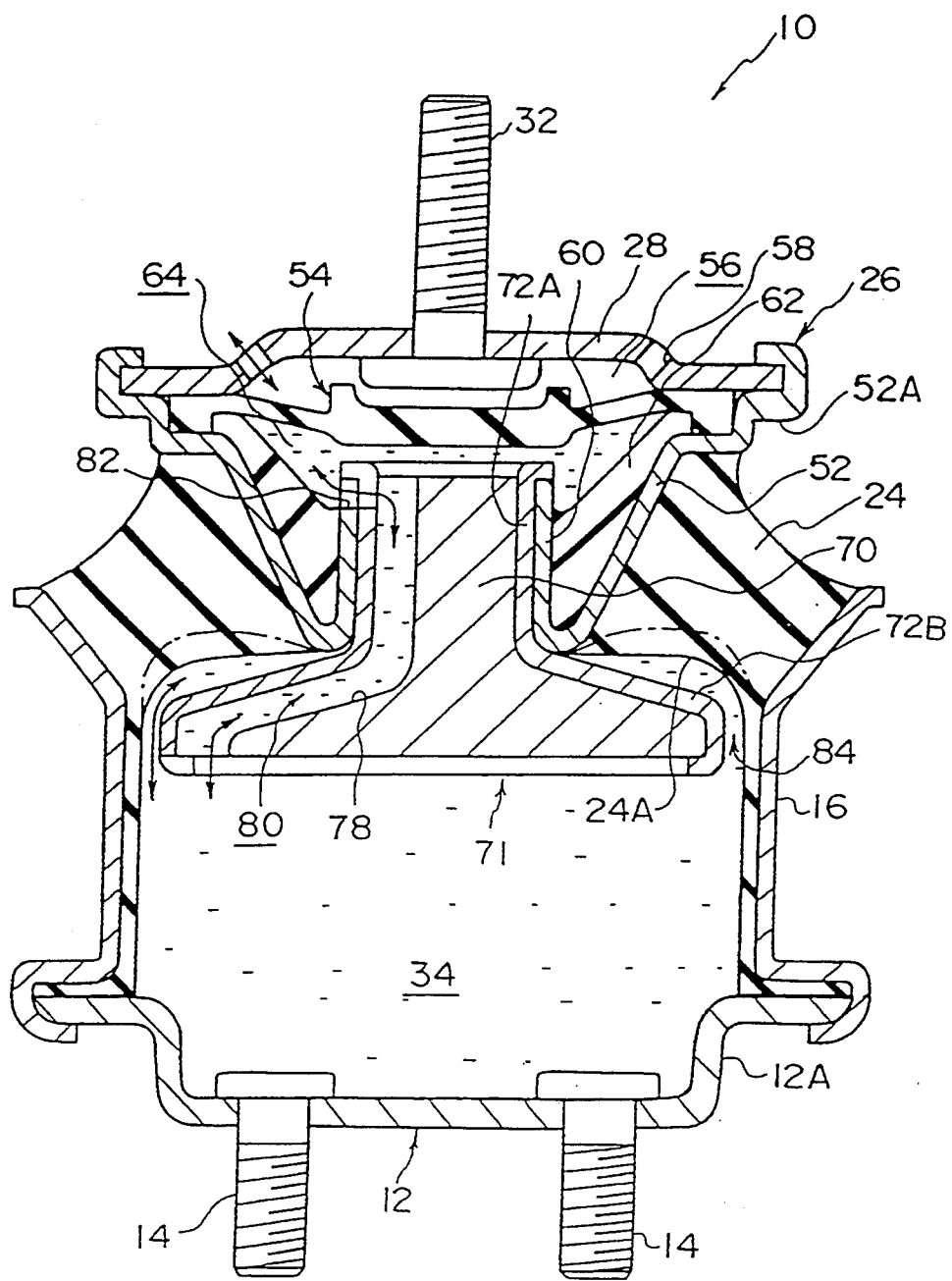
FIG. 1 is a cross-sectional view which illustrates a vibration isolating apparatus relating to a first embodiment of the present invention and which is taken along an axis of the vibration isolating apparatus.
Figure 2:
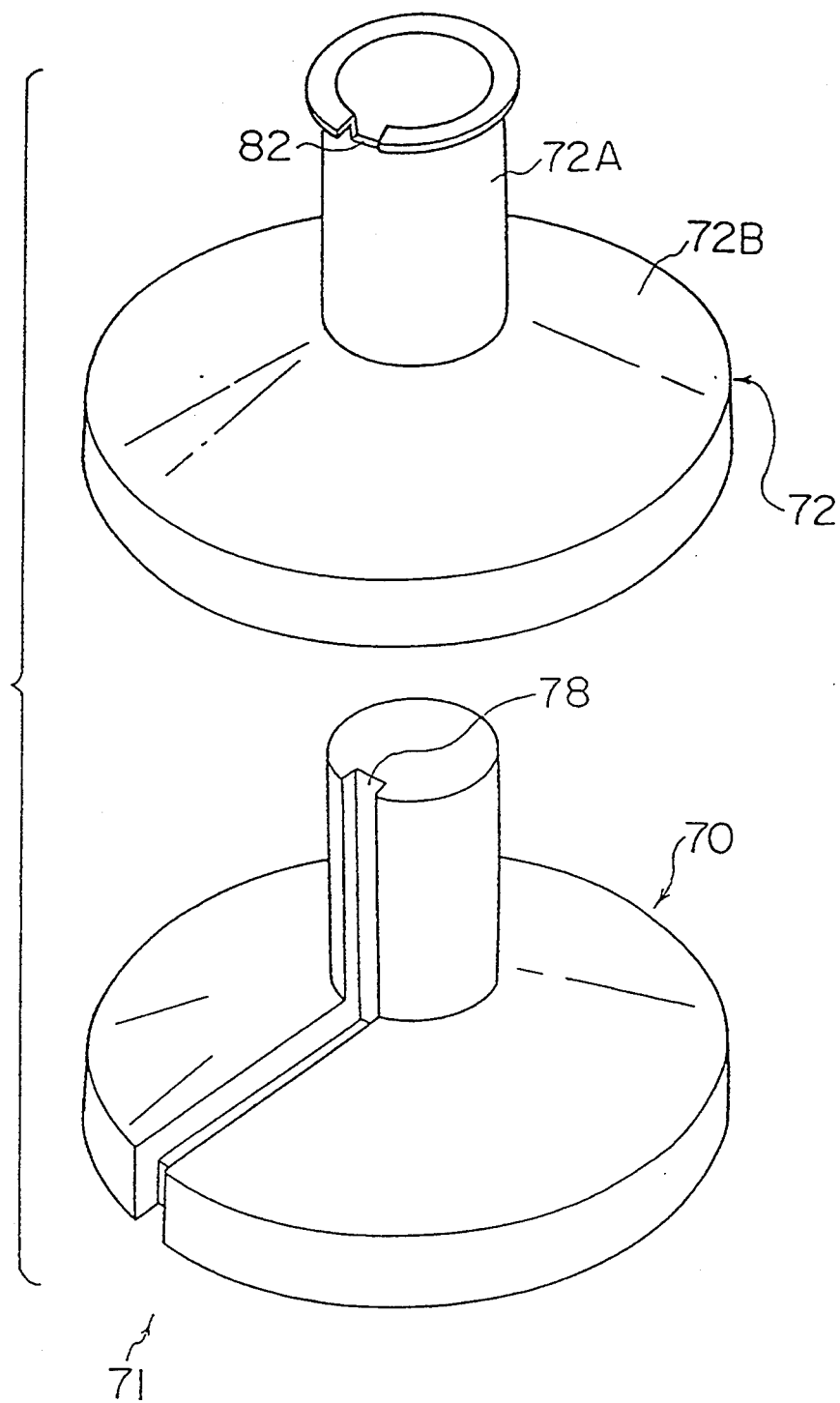
FIG. 2 is an exploded perspective view illustrating a vibrating body of the vibration isolating apparatus relating to the first embodiment of the present invention.

FIGS. 1 and 2 illustrate a vibration isolating apparatus 10 relating to a first embodiment of the present invention.

As shown in FIG. 1, the vibration isolating apparatus 10 is equipped with a base plate 12. A pair of mounting bolts 14, which are used for mounting the vibration isolating apparatus 10 to an unillustrated vehicle body, are secured to the base plate 12.

The periphery of the base plate 12 includes a standing portion 12A. A lower end portion of an outer cylinder 16, whose axis is vertical, is fixed by caulking to the standing portion 12A. An outer peripheral portion of an elastic body 24 is bonded by vulcanization to an inner peripheral surface of an upper end portion of the outer cylinder 16. An expanding diameter portion 52, whose diameter increases towards the top thereof, of a supporting block 26 is bonded by vulcanization to a substantially central portion of the elastic body 24.

A liquid, such as water or oil, is filled in the interior portion defined by the elastic body 24, the outer cylinder 16, and the base plate 12 so as to form a pressure-receiving liquid chamber 34.

Further, an upper end portion of the expanding diameter portion 52 is a flange portion 52A. The periphery of the flange portion 52A is bent toward the inner side so as to nip and be fixed to a periphery of a top plate 28. A mounting bolt 32 is provided at a central portion of the top plate 28, and can be loaded and fixed to an unillustrated engine.

A periphery of a membrane 54, which is formed of an elastic body, is interposed between the top plate 28 and the flange portion 52A of the supporting block 26. An air chamber 56 is formed between the membrane 54 and the top plate 28. The air chamber 56 communicates with the outside air by an air hole 58 formed in the top plate 28.

A cylindrical portion 60 is disposed at an inner side of the expanding diameter portion 52 of the supporting block 26. A lower end portion of the cylindrical portion 60 is integral with a lower end portion of the expanding diameter portion 52. An elastic body 52 is bonded by vulcanization to an outer periphery of the cylindrical portion 60 and an inner periphery of the expanding diameter portion 52. Liquid is filled between the elastic body 62 and the membrane 54 so as to form a first auxiliary liquid chamber 64.

A cylindrical portion 72A of an outer frame 72, which forms a vibrating body 71, is inserted in the inner side of the cylindrical portion 60. An umbrella portion 72B, whose diameter gradually increases towards the bottom thereof, is provided at the bottom side of the cylindrical portion 72A. The umbrella portion 72B is disposed at an upper side of the interior of the pressure-receiving liquid chamber 34. An inclined surface of the umbrella portion 72B is separated by a fixed dimension from a bottom surface 24A of the elastic body 24. An annular gap 84 is formed between an outer periphery of the umbrella portion 72B and an inner periphery of the pressure-receiving liquid chamber 34. A vicinity of the gap 84 is a liquid-column resonance generating portion. The gap 84 may be formed when an unillustrated engine is mounted on the top plate 28. Further, the outer frame 72 is fixed to the cylindrical portion 60 of the supporting block 26 by the upper end of the cylindrical portion 72A being enlarged in diameter.

As shown in FIG. 2, a core 70 is inserted into the outer frame 72. The core 70 is a block shape whose outer diameter is along the configuration of the inner surface of the outer frame 72 such that the outer peripheral surface of the core 70 is fixed to the inner peripheral surface of the outer frame 72. The core 70 is fixed to the outer frame 72 by a lower end portion of the outer frame 72 being bent inwardly. Further, a groove 78 is formed in the radially outer peripheral surface of the core 70 such that the longitudinal direction of the groove 78 is the vertical direction. One end of the groove 78 communicates with the top surface of the core 70 whereas the other end of the groove 78 communicates with the bottom surface of the core 70. The groove 78 is enclosed by the outer frame 72 so as to form a long, thin first limiting passage 80. Cut-outs 82 are formed respectively in an upper end portion of the cylindrical portion 60 of the supporting block 26 and an upper end portion of the cylindrical portion 72A of the outer frame 72 so as to correspond to the groove 78.

Next, the operation of the present embodiment will be described.

The base plate 12 of the vibration isolating apparatus 10 is fixed to an unillustrated vehicle body via the mounting bolts 14. The top plate 28 is loaded and fixed to unillustrated engine by the mounting bolt 32. Vibrations of the engine are thereby supported to the unillustrated vehicle body via the elastic body 62. At this time, the vibrations of the engine are absorbed by resistance based on internal friction of the elastic body 62. The vibrating body 71 vibrates along with the vibrations of the supporting block 26, which is vibrated by the engine vibrations.

When low-frequency vibrations are applied to the supporting block 26, the liquid in the pressure-receiving liquid chamber 34 passes through the first limiting passage 80 and elastically deforms the membrane 54. In the first limiting passage 80, the liquid receives a large passing resistance or liquid-column resonance is generated. Because the dimension of the first limiting passage 80 in the direction of flow of the liquid is long, the liquid-column resonance is large. Accordingly, the dynamic spring constant of the low-frequency area greatly decreases, and low-frequency vibrations are effectively absorbed.

On the other hand, when high-frequency vibrations are generated, the first limiting passage 80 becomes blocked. In this case, there is liquid-column resonance of the liquid in the pressure-receiving liquid chamber 34 at a vicinity of the annular gap 84 formed between the outer periphery of the umbrella portion 72B and the inner wall of the pressure-receiving liquid chamber 34. The dynamic spring constant decreases, and high-frequency vibrations are absorbed.

Second Embodiment

Figure 3:
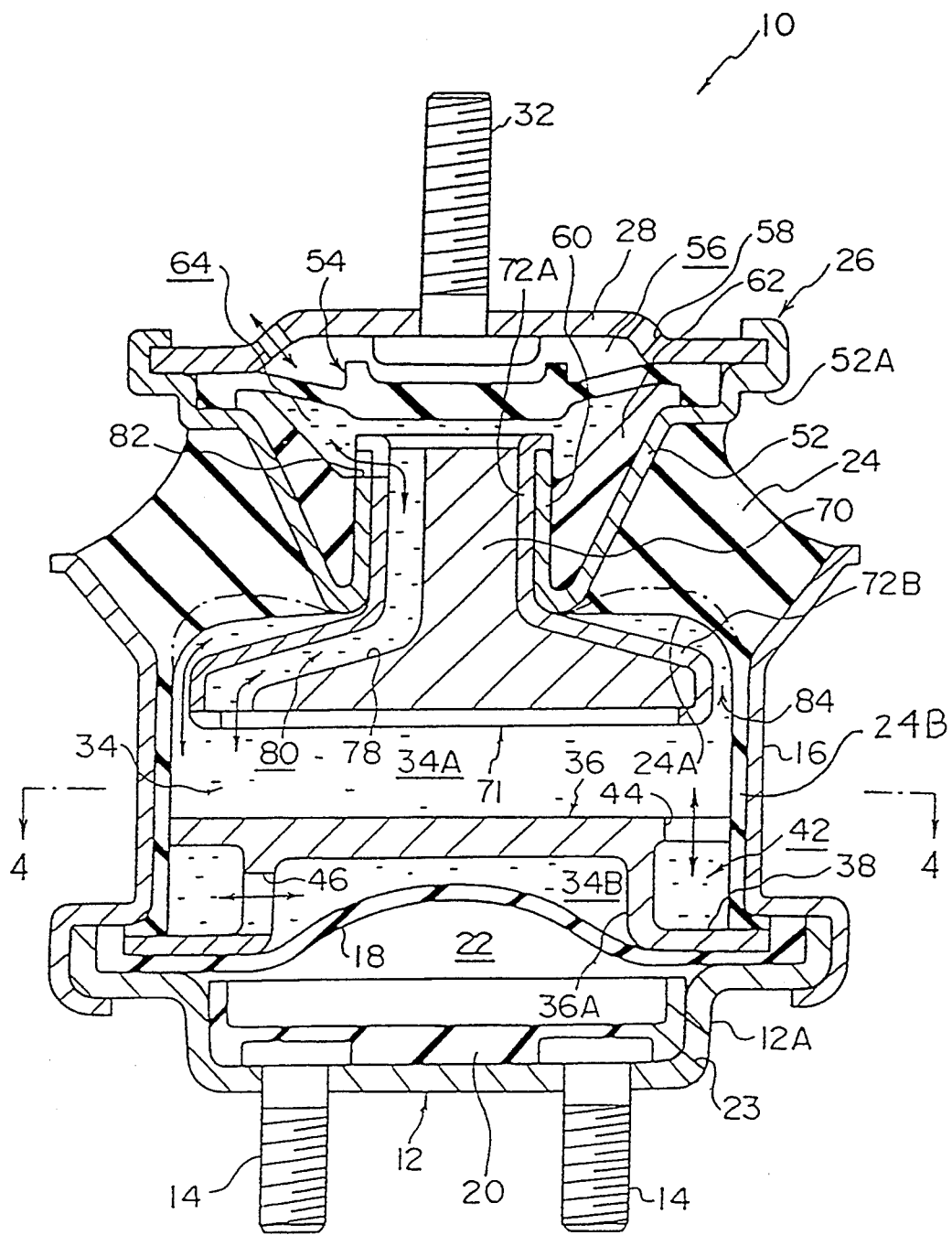
FIG. 3 is a sectional view which illustrates a vibration isolating apparatus relating to a second embodiment of the present invention, and which is taken along line 3—3 of FIG. 4 along an axis of the vibration isolating apparatus.
Figure 4:
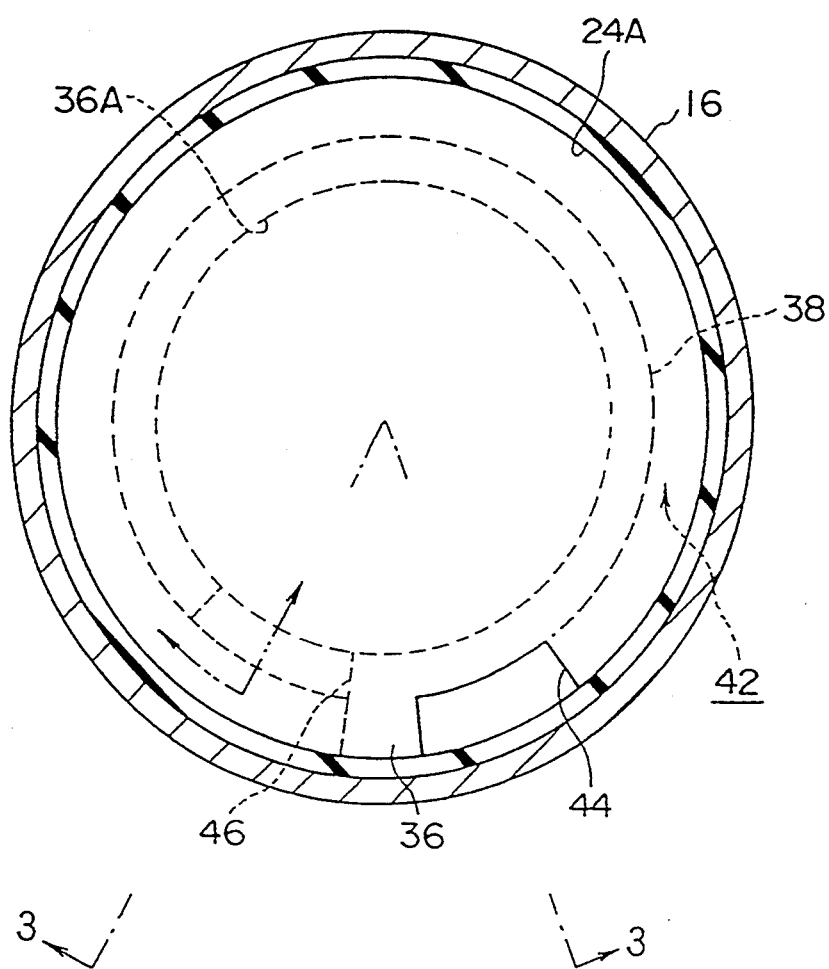
FIG. 4 is a sectional view which illustrates the vibration isolating apparatus relating to the second embodiment of the present invention, and which is taken along line 4—4 of FIG. 3.

FIGS. 3 and 4 illustrate the vibration isolating apparatus 10 relating to a second embodiment of the present invention.

Structures similar to those of the first embodiment are designated by the same reference numerals, and descriptions thereof are omitted.

As shown in FIG. 3, in the vibration isolating apparatus 10 of the present embodiment, the periphery of a diaphragm 18, which is formed of a thin-walled elastic body, is interposed between the outer cylinder 16 and the standing portion 12A of the base plate 12. An air chamber 22 is formed between the diaphragm 18 and the base plate 12. The diaphragm 18 is more flexible than the above-described membrane 54. In the present embodiment, the diaphragm 18 is more flexible than the membrane 54 because the diaphragm 18 is thinner than and has a larger surface area than the membrane 54. However, it suffices to increase the flexibility by decreasing the hardness of the elastic body.

A diaphragm protecting cover 20, which is formed of an elastic body, is attached to the inner surface of the base plate 12, and is used as a buffer when the diaphragm 18 is about to abut the base plate 12. Further, an air hole 23, which communicates the air chamber 22 to the exterior, is formed so as to penetrate the diaphragm protective cover 20 and the standing portion 12A.

Further, the pressure-receiving liquid chamber 34 shown in the first embodiment is, in the second embodiment, divided by a partitioning body 36 into a pressure-receiving liquid chamber 34A and a second auxiliary liquid chamber 34B. A peripheral bottom end portion of the partitioning body 36 is interposed and fixed between the diaphragm 18 and the outer cylinder 16.

As shown in FIG. 4, a groove 38 is formed in the partitioning body 36 from an outer peripheral portion to an axially central portion thereof. The groove 38 is a C-shape when viewed from above the partitioning body 36. An outer periphery of the groove 38 is fitted to an extended portion 24B of the elastic body 24 which is provided so as to extend to an inner peripheral portion of the outer cylinder 16. In this way, the groove 38 forms a second limiting passage 42, which is a C-shape when viewed from above the partitioning body 36. As illustrated in FIG. 3, one end of the second limiting passage 42 communicates with the pressure-receiving chamber 34A through a hole 44 formed in a top portion of the partitioning body 36. Another end of the second limiting passage 42 communicates with the second auxiliary liquid chamber 34B through a hole 46 which is formed in an inner peripheral surface of a concave portion 36A formed from the bottom portion of the partitioning body 36.

In the present embodiment, the passing resistance of the liquid in the second limiting passage 42 is greater than the passing resistance of the liquid in the first limiting passage 80. However, these resistances may be the same depending on the case.

Next, the operation of the present embodiment will be described.

Shake vibration, such as the vibration generated when an engine starts, has a relatively low frequency and large amplitude (e.g., vibration having a frequency of approximately 10 Hz and an amplitude of about ±1.0 mm). In the vibration isolating apparatus 10 of the second embodiment, when shake vibration is applied to the supporting block 26, the liquid within the pressure-receiving liquid chamber 34A passes through the second limiting passage 42 and moves to the second auxiliary liquid chamber 34B. In this case, because the membrane 54, which faces the first auxiliary liquid chamber 64, is more rigid than the diaphragm 18, the membrane 54 hardly deforms. The volume change in the first auxiliary liquid chamber 64 is small, and the liquid does not flow into the first limiting passage 80. Accordingly, the liquid within the pressure-receiving chamber 34A flows into the second limiting passage 42. A high loss factor can be obtained by the passing resistance in the second limiting passage 42, and the shake vibration is absorbed.

Idle vibration is vibration of a relatively high frequency and low amplitude (e.g., vibration having a frequency of approximately 20 to 30 Hz and an amplitude of about±0.1 to 0.3 mm). When idle vibration is generated, the second limiting passage 42 becomes blocked. However, the liquid in the pressure-receiving liquid chamber 34A passes through the first limiting passage 80 and elastically deforms the membrane 54. Liquid-column resonance is generated in the liquid in the first limiting passage 80, the dynamic spring constant decreases, and the idle vibration is absorbed.

Further when high-frequency vibration (e.g., vibration having a frequency of approximately 100 to several hundred Hz), which causes shaking sounds and the like, is generated, the first limiting passage 80 becomes blocked. However, in this case, there is liquid-column resonance of the liquid in the pressure-receiving liquid chamber 34A in the vicinity of the annular gap 84 formed between the outer periphery of the umbrella portion 72B and the inner wall of the pressure-receiving liquid chamber 34A. The dynamic spring constant decreases, and the high-frequency vibration which causes shaking sounds and the like is absorbed.

FIG. 9 illustrates the vibration isolating characteristic of the vibration isolating apparatus 10 relating to the second embodiment.

As shown in FIG. 9, in the vibration isolating apparatus 10 relating to the second embodiment, a large loss factor is obtained in the vicinity of frequency of 10 Hz. In respective vicinities of frequencies of 30 Hz and 100 to 300 Hz, the dynamic spring constant decreases, and a wide range of vibrations can be effectively absorbed.

Third Embodiment

Figure 5:
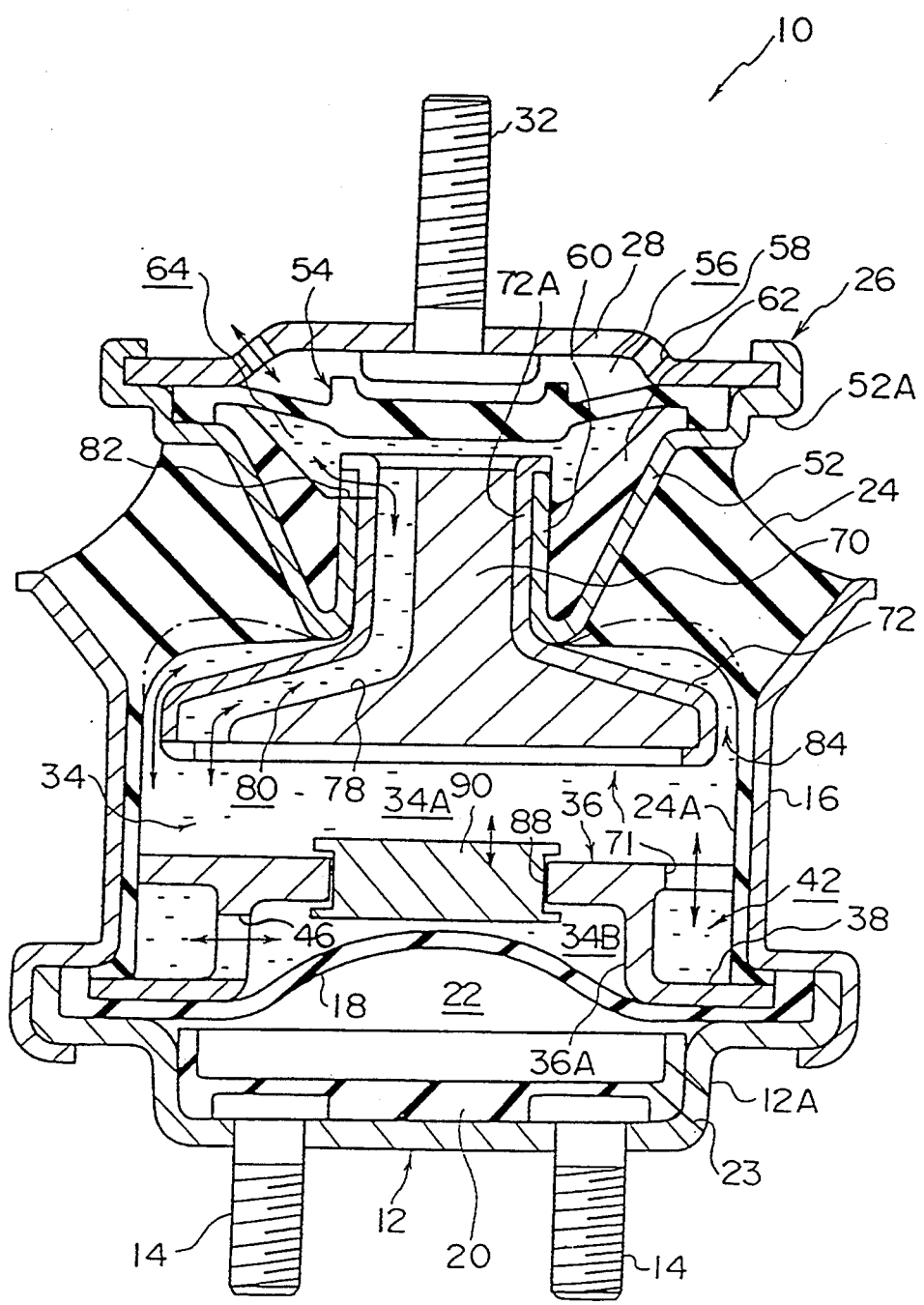
FIG. 5 is a cross-sectional view which illustrates a vibration isolating apparatus relating to a third embodiment of the present invention, and which is taken along an axis of the vibration isolating apparatus.

FIG. 5 illustrates the vibration isolating apparatus 10 relating to a third embodiment of the present invention.

Structures similar to those of the first embodiment are designated by the same reference numerals, and descriptions thereof are omitted. In the present embodiment, a large-diameter hole 88 is formed so as to penetrate a center of the partitioning body 36. A movable body 90 is mounted in the hole 88 so as to be able to move slightly.

In the present embodiment, when, for example, a vibration of an arbitrary frequency between 30 and 100

Figure 5A:
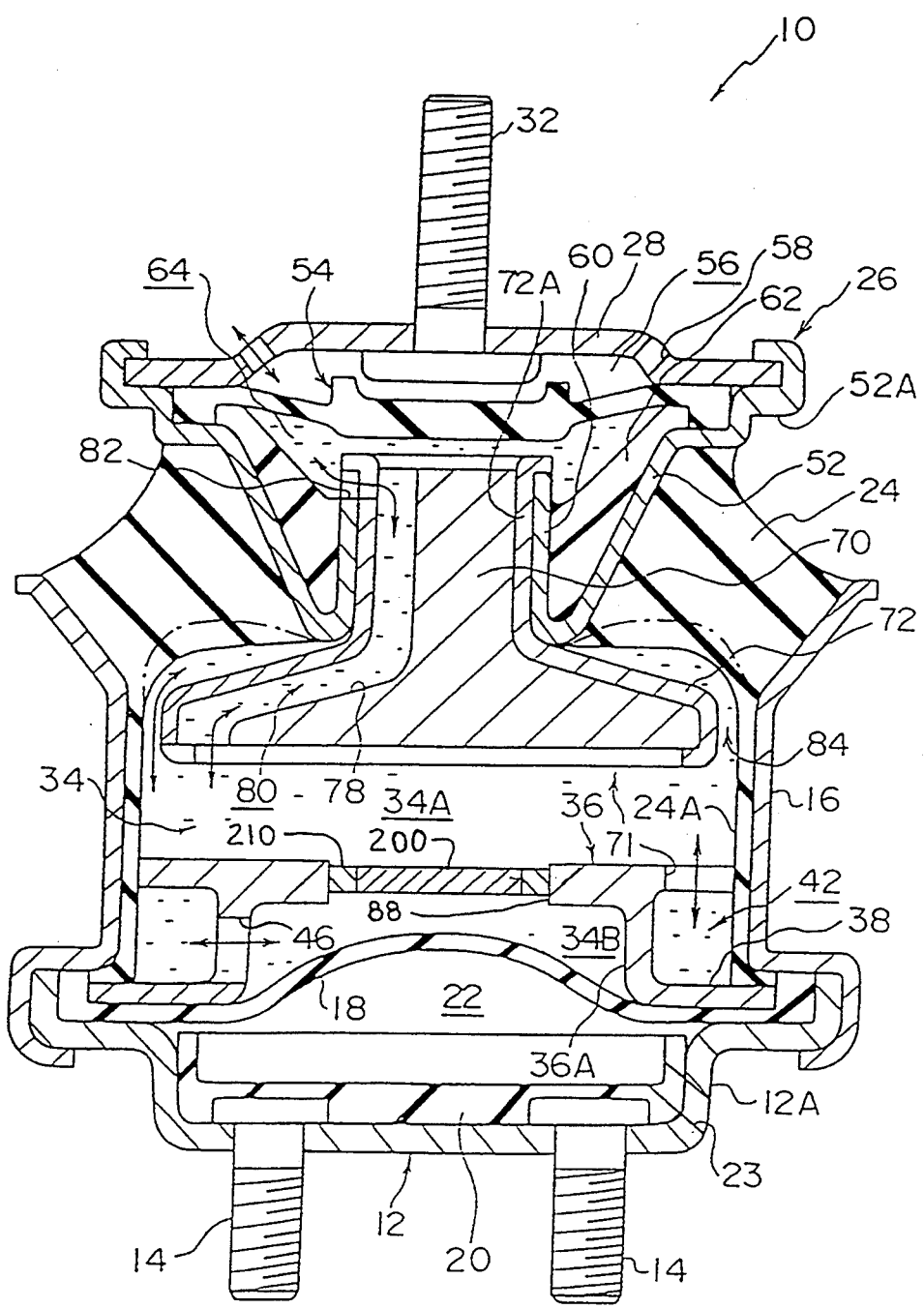
FIG. 5A is a cross sectional view which illustrates a vibration isolating apparatus relating to a fourth embodiment of the present invention.

Hz is input, the movable body 90 vibrates slightly and limits the increase in pressure within the pressure-receiving liquid chamber 34A. Vibrations of frequencies between those of idle vibrations and high-frequency vibrations can be absorbed by the dynamic spring constant being lowered. As shown in FIG. 5A, instead of being closed by a movable body 90, the hole 88 may be closed by a diaphragm 200 formed of or supported by an elastic body 210. By the diaphragm 200 moving slightly or deforming, the rise in pressure within the pressure-receiving chamber 34A may be limited.

Figure 6:
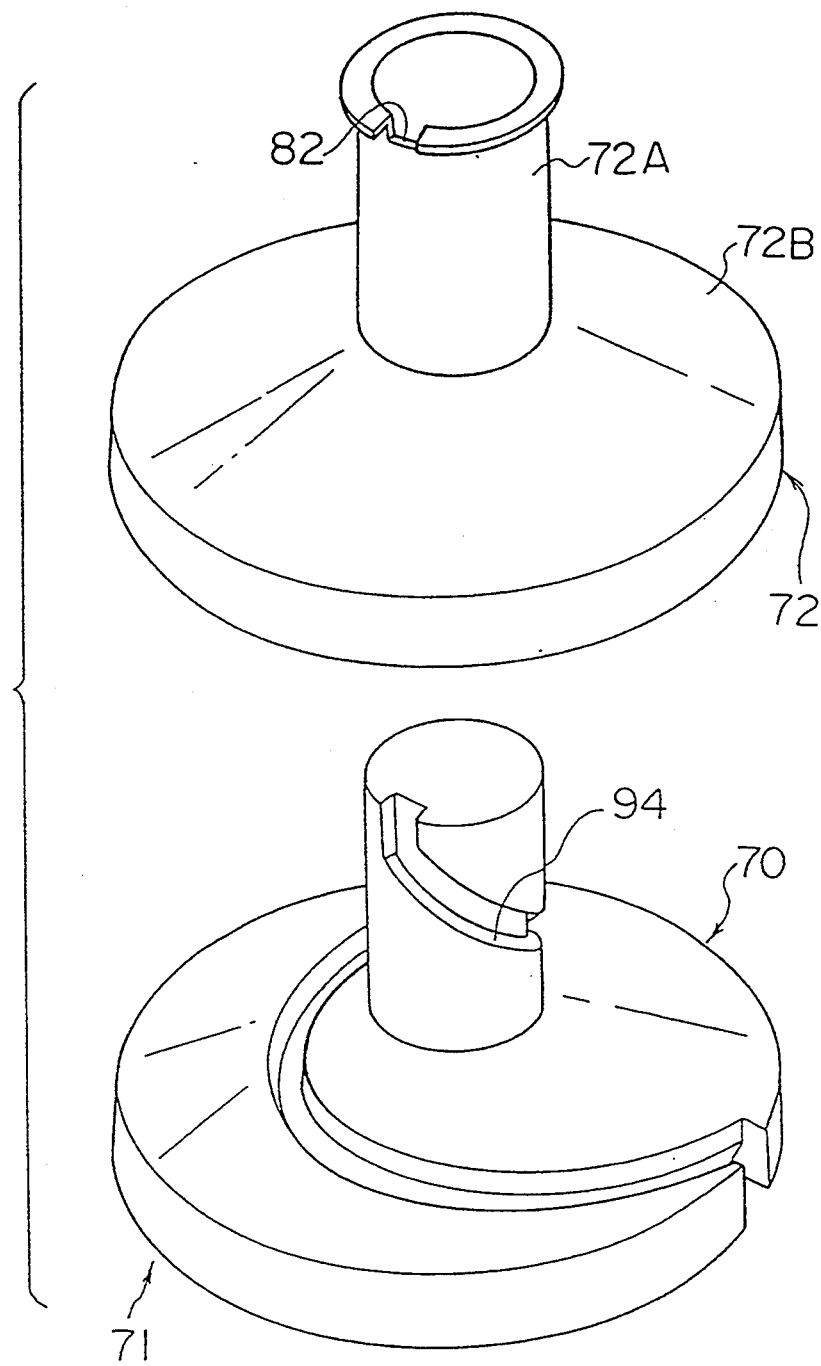
FIG. 6 is a exploded perspective view illustrating a vibrating body relating to another embodiment of the present invention.

In each of the above-described embodiments, the vibrating body 71 is structured such that the groove 78 is provided in the vertical directions in the outer peripheral surface of the core 70. However, the present invention is not limited to the same. As shown in FIG. 6, the vibrating body 71 may be structured such that a spiral groove 94 is provided in the outer peripheral surface of the core 70. In this case, the loss factor (tanδ) can be increased because the dimension of the first limiting passage 80 in the direction of flow of the liquid is longer. The efficiency of absorbing idle vibrations can thereby be further improved.

Figure 7:
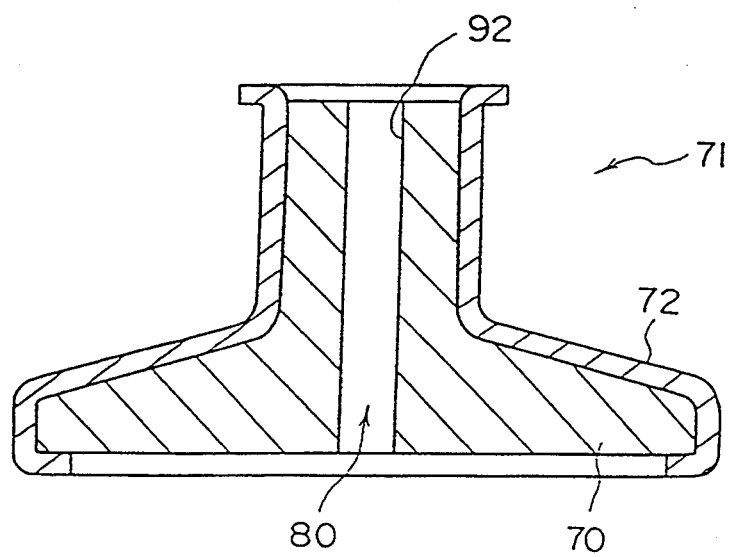
FIG. 7 is a cross-sectional view illustrating a vibrating body relating to another embodiment of the present invention.

Further, as shown in FIG. 7, the vibrating body 71 may be structured such that a through-hole 92 is provided in an axial center of the core 70. This through-hole 92 is the first limiting passage 80.

Figure 8:
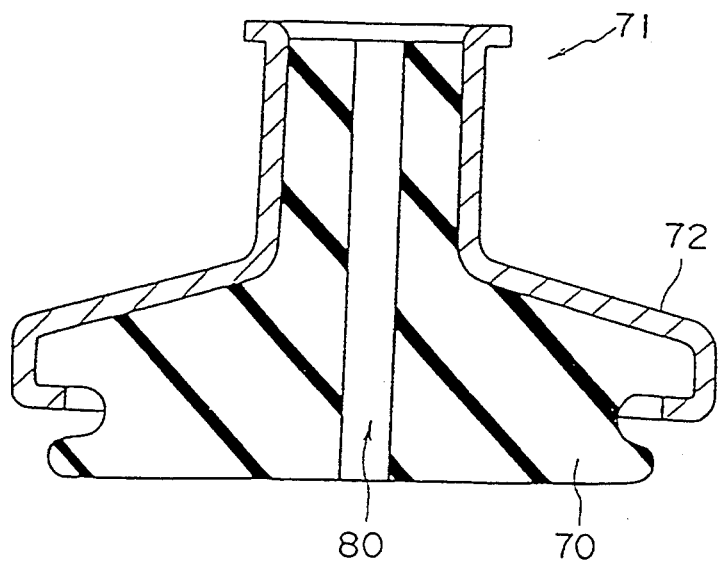
FIG. 8 is a cross-sectional view illustrating a vibrating body relating to another embodiment of the present invention.

As shown in FIG. 8, the vibrating body 71 may be structured such that the core 70 is formed of an elastic body, and the bottom edge of the core 70 protrudes further downward than the outer frame 72. In this case, when the vibrating body 71 moves downward greatly, the bottom surface of the core 70 abuts the partitioning body 36 so as to limit downward movement of the supporting block 26. The bottom surface of the core 70 can prevent a strange noise from being generated at the time of this abutment.

Moreover, the vibrating body 71 may be structured so that the core 70 and the outer frame 72 are formed integrally rather than separately.

What is claimed is:

1. A vibration isolating apparatus comprising:
   a first mounting member connected to one of a vibration generating portion and a vibration receiving portion;
   a second mounting member connected to another of the vibration generating portion and the vibration receiving portion;
   an elastic body provided between said first mounting member and said second mounting member and deformable when vibration is generated by said vibration generating portion, said elastic body having a separating wall;
   a pressure-receiving liquid chamber formed as a portion of said separating wall of said elastic body, and able to expand and contract;
   a vibrating body mounted to one of said first mounting member and said second mounting member and disposed between said elastic body and said pressure-receiving liquid chamber to form a gap between said vibrating body and an inner wall surface of said pressure-receiving chamber;
   a first auxiliary liquid chamber separated from said pressure-receiving liquid chamber and positioned between said first mounting member and said elastic body; and
   a first limiting passage penetrating said vibrating body and communicating said pressure-receiving liquid chamber and said first auxiliary liquid chamber.

2. A vibration isolating apparatus according to claim 1, wherein said first limiting passage is a liquid-column resonance generating portion when said vibration generating portion generates low-frequency vibrations, and a region surrounding a portion of said gap is a liquid-column resonance generating portion when said vibration generating portion generates high-frequency vibrations.

3. A vibration isolating apparatus according to claim 1, wherein said vibrating body is formed of a cylindrical portion and an umbrella portion extended from the cylindrical portion and radially expanding in a direction opposite to the cylindrical portion, an outer periphery of the umbrella portion being formed substantially along the inner wall surface of said pressure-receiving liquid chamber so as to maintain said gap.

4. A vibration isolating apparatus according to claim 3, wherein said first limiting passage has a length which is at least an axial length of said vibrating body.

5. A vibration isolating apparatus according to claim 4, wherein said first limiting passage is a through-hole passing through an axial center of said vibrating body.

6. A vibration isolating apparatus according to claim 4, wherein said first limiting passage is a spiral groove provided in an inner portion of said vibrating body.

7. A vibration isolating apparatus according to claim 1, wherein said first auxiliary liquid chamber is positioned such that said elastic body is interposed between said first auxiliary liquid chamber and said pressure-receiving liquid chamber.

8. A vibration isolating apparatus according to claim 1, further comprising a second elastic body positioned between the vibration generating portion and said first auxiliary liquid chamber, the second elastic body forming a portion of a separating wall of said first auxiliary liquid chamber.

9. A vibration isolating apparatus according to claim 1, wherein said vibrating body has a substantially annular gap provided between said vibrating body and a portion of the inner wall surface of said pressure-receiving liquid chamber.

10. A vibration isolating apparatus according to claim 9, wherein a region surrounding a portion of said gap is a liquid-column resonance generating portion when said vibration generating portion generates high-frequency vibrations.

11. A vibration isolating apparatus according to claim 1, wherein said vibrating body is formed of a core portion and an outer frame, said core portion comprising an elastic member, said elastic member protruding further toward the vibration receiving portion than said outer frame.

12. A vibration isolating apparatus according to claim 1, further comprising:
   a second auxiliary liquid chamber positioned between the vibration receiving portion and said pressure-receiving liquid chamber;
   a partitioning body partitioning said pressure-receiving liquid chamber and said second auxiliary liquid chamber;
   a second limiting passage communicating said pressure-receiving liquid chamber and said second auxiliary liquid chamber; and a second elastic body positioned between the vibration receiving portion and said second auxiliary liquid chamber, the second elastic body forming a part of a separating wall of said second auxiliary liquid chamber.

13. A vibration isolating apparatus according to claim 12, wherein a passing resistance of said second limiting passage is at most a passing resistance of liquid of said first limiting passage.

14. A vibration isolating apparatus according to claim 13, wherein said second limiting passage has at least one of a cross-sectional area greater than a cross-sectional area of said first limiting passage and a length smaller than a length of said first limiting passage.

15. A vibration isolating apparatus according to claim 12, further comprising a third elastic body positioned between the vibration generating portion and said first auxiliary liquid chamber, the third elastic body forming a portion of a separating wall of said first auxiliary liquid chamber.

16. A vibration isolating apparatus according to claim 15, wherein said second elastic body is as hard as said third elastic body and more flexible than said third elastic body.

17. A vibration isolating apparatus according to claim 16, wherein said second elastic body has at least one of a thickness smaller than a thickness of said third elastic body and a deformable area larger than a deformable area of said third elastic body.

18. A vibration isolating apparatus according to claim 16, wherein said second elastic body and said third elastic body are made of rubber materials, and a rubber material of said second elastic body is one of as hard as a rubber material of said third elastic body and more flexible than the rubber material of said third elastic body.

19. A vibration isolating apparatus according to claim 12, wherein said partitioning body further includes a through hole and a movable body positioned in the through hole, the movable body being movable between the pressure receiving liquid chamber and the second auxiliary liquid chamber.

20. A vibration isolating apparatus according to claim 12, wherein said partitioning body includes a through hole and a deformable member positioned to penetrate and seal the through hole.

21. A vibration isolating apparatus according to claim 20, wherein said deformable member is attached to and supported by a third elastic body.

22. A vibration isolating apparatus according to claim 20, wherein said deformable member is formed as a part of a third elastic body.

23. A vibration isolating apparatus comprising:
a first mounting member connected to one of a vibration generating portion and a vibration receiving portion;
a second mounting member connected to another of the vibration generating portion and the vibration receiving portion;
an elastic body provided between said first mounting member and said second mounting member and deformable when vibration is generated by said vibration generating portion;
a pressure-receiving liquid chamber formed as a portion of a separating wall of said elastic body, and able to expand and contract;
a vibrating body mounted to one of said first mounting member and said second mounting member and disposed in said pressure-receiving liquid chamber to form a gap between said vibrating body and an inner cylindrical side wall surface of said pressure-receiving liquid chamber;
a first auxiliary liquid chamber separated from said pressure-receiving liquid chamber; and
a first limiting passage penetrating said vibrating body and communicating said pressure-receiving liquid-chamber and said first auxiliary liquid-chamber, wherein said first limiting passage is a spiral groove provided in an inner portion of said vibrating body.

24. A vibration isolating apparatus according to claim 23, wherein said vibrating body is formed of a cylindrical portion and an umbrella portion extending from said cylindrical portion and radially expanding in a direction opposite to said cylindrical portion.

* * * * *